MIX VINYL RESIN, PLASTICIZER AND PHENOL-ALDEHYDE RESIN TO UNIFORM HOMOGENEOUS CONDITION WHILE PREVENTING ADVANCEMENT OF PHENOL-ALDEHYDE RESIN TO "THERMOSET" CONDITION

↓

MECHANICALLY WORK RESULTING MIXTURE AT A TEMPERATURE SUFFICIENTLY HIGH TO ADVANCE THE PHENOL-ALDEHYDE RESIN TO THE INSOLUBLE, INFUSIBLE STAGE

↓

SHAPE HOT RESULTING MIXTURE

↓

COOL

↓

FINISHED ARTICLE

INVENTORS
SIDNEY E. BERGER
KERMIT M. WEBB
BY
*Robert J. Patterson*
ATTORNEY

Patented Nov. 17, 1953

2,659,708

UNITED STATES PATENT OFFICE 2,659,708

MIXTURES OF PLASTICIZED VINYL RESIN AND THERMOSET PHENOL-ALDEHYDE RESIN AND METHOD OF MAKING THE SAME

Sidney E. Berger, Cranston, R. I., and Kermit M. Webb, Swansea, Mass., assignors to United States Rubber Company, New York, N. Y., a corporation of New Jersey Application January 10, 1951, Serial No. 205,364

12 Claims. (Cl. 260—43)

This invention relates to a new composition of matter and method of making the same. More particularly, it relates to a novel composition of matter comprising a vinyl resin, a plasticizer therefor, and a thermoset phenol-aldehyde resin of the novolac type which has been advanced to the insoluble, infusible stage while in intimate and homogeneous admixture with the vinyl resin and the plasticizer.

The composition of our invention is particularly characterized by the fact that it can be shaped after suitable conditioning as hereinafter described, even though its phenolic resin content is in the insoluble, infusible form. Thus, upon being mechanical worked at a suitably elevated temperature, at least 300° F., the composition of our invention becomes plastic so that it can be given any desired shape after the shaped mass is cooled to form a final article which has outstanding physical properties at both high and low temperatures, good flexibility over a wide temperature range, good resistance to mechanical deformation at high temperatures, good resistance to abrasion and impact, good resistance to the action of oils and other solvents, excellent water-stability, and outstanding electrical resistance.

The accompanying drawing portrays diagrammatically the process of our invention.

We have discovered that a composition of matter having the foregoing characteristics can be manufactured in a commercially feasible manner by providing an intimate homogeneous mixture of vinyl resin, a plasticizer therefor and a thermoset phenol-aldehyde resin of the novolac type which has been advanced to the insoluble, infusible stage while in intimate and homogenous admixture with the plasticized vinyl resin, this mixture being shaped to final desired form after such advancement of the phenolic resin to the insoluble, infusible stage.

Our invention is based upon the surprising discovery that greatly improved results are obtained by forming an intimate homogeneous mixture of a phenolic resin of the novolac type, a hardening agent for the phenolic resin, and a plasticized vinyl resin compatible with the phenolic resin by mechanically mixing the ingredients at a relatively low temperature below that at which the phenolic resin would be advanced to any substantial extent toward the insoluble, infusible stage, then advancing the phenolic resin in the mixture to the insoluble, infusible stage by heating the mixture at a temperature sufficiently elevated to effect such advancement while mechanically working the mixture, shaping the resulting mixture while hot, and allowing the shaped mixture to cool to a point at which it retains its shape. It was surprising to discover that such a mixture would remain plastic and could be shaped even though the phenolic resin contained therein had been advanced to the final thermoset condition. This composition can be shaped, as by extrusion (as around wire or in the form of pipe, rod, etc.), calendering (as for example where it is desired to calender it upon a textile fabric) by first subjecting it to the combination of heat (a temperature of at least 300° F. but below the point of thermal decomposition should be used) and mechanical working, as on a two-roll open rubber mill or in a Banbury mixer or other device exerting an intensive mixing and kneading action. The composition is rendered plastic and workable in this fashion and is then shaped, after which the shaped article is allowed to cool. The resulting composition is remarkably resistant to the action of heat alone and can be subjected to temperatures of the same order as those to which it was exposed during the advancement of the phenolic resin and during the mechanical working, or even to higher temperatures, without being materially deformed. The limit on temperature is the point of thermal decomposition.

After the composition has been allowed to cool, it can be rendered plastic and shapable at any future time by exposure simultaneously to heat of the same order as that mentioned above and to mechanical working.

In the preferred practice of our invention the proportion of the phenolic resin does not exceed 20% by weight, and still more preferably it does not exceed 15% by weight based on the sum of the vinyl resin, the plasticizer therefor and the phenolic resin. Larger proportions of the phenolic resin than 15% or 20% can be used but are objectionable because they render the mixture more difficult to work and shape, and because for many applications they render the final product excessively stiff. However, in the broader aspects of our invention, the proportion of the phenolic resin on the above basis can range as high as 50%.

It is preferred that at least 5% of the phenolic resin, on the above basis, be used in the composition of our invention in order that the advantages of the presence of the phenolic resin may be realized to a substantial extent. Still more preferably, the proportion of phenolic resin is at least 10%.

Our invention is unique in that we effect the curing of the phenolic resin to the final thermoset state while the mixture is being mechanically worked, and in that we subsequently shape the mixture containing the cured phenolic resin. To the best of our knowledge, this has not been done heretofore.

By proceeding in accordance with the foregoing principles we obtain the many advantages of the presence of the thermoset phenolic resin in the final shaped structure, and at the same time we avoid the difficulties which would be encountered were it attempted to cure the mixture after shaping. Thus, if it were attempted to shape the mixture by processes typified by extrusion or calendering prior to curing of the phenolic resin, the phenolic resin would start to cure during such shaping with the result that the viscosity would change and uneven shaping would result, if shaping were possible at all. Furthermore, gases evolved during the shaping by the advancement of the phenolic resin, would cause porosity in the shaped composition, whereas in our invention the gases evolved as by-products during the curing of phenolic resin are completely removed during the mechanical working. A major advantage of shaping after cure of the phenolic resin content of the mixture is the great economy in processing.

The preferred vinyl resin is polyvinyl chloride, especially the form known as gamma polyvinyl chloride. Alternatively, although less preferably, we can employ resinous copolymers of a major proportion (typically 85% or more) of vinyl chloride and a minor proportion (typically not over 15%) of a copolymerizable monomeric monoolefinic compound such as vinyl acetate, vinylidene chloride or the like. The vinyl resin should be completely compatible with the phenolic resin in unset condition.

The vinyl resin is used in admixture with a plasticizer which is a substantially non-volatile compatible softener for the vinyl resin, i. e., a solvent therefor. The plasticizer should also be completely compatible with the phenolic resin when the latter is in its soluble, fusible stage.

One of the most suitable plasticizers for use in our invention is a rubbery copolymer of butadiene and acrylonitrile, commonly known as Buna N, such as a copolymer of from 55 to 85% of butadiene and correspondingly from 45 to 15% of acrylonitrile.

We can also use any of the normally liquid non-volatile compounds which are well-known as solvent-type plasticizers for vinyl resins of the type detailed above, subject only to the requirement that they be completely compatible with all of the other ingredients in the mixture prior to conversion of the phenolic resin to the thermoset condition. Such plasticizers are generally esters, examples being dioctyl phthalate (di-(2-ethyl-hexyl) phthalate), tricresyl phosphate, dibutyl phthalate, dibutyl sebacate, etc. Dioctyl phthalate is especially preferred. We can of course use a mixture of Buna N and a normally liquid plasticizer. The proportions in such a mixture can vary from 100% Buna N to 100% liquid plasticizer.

We can use a composite plasticizer for example a mixture comprising a major proportion of a rubbery copolymer of butadiene and acrylonitrile and a minor proportion of a liquid plasticizer. Alternatively, we can use all butadiene-acrylonitrile rubbery copolymer or we can use all liquid plasticizer.

Any thermosetting phenol-aldehyde resin of the novolac type which is compatible with the vinyl resin and the plasticizer can be used. We have obtained especially good results using a cashew nut shell oil-modified phenol-formaldehyde resin. There is used in conjunction with the resin a hardening agent therefor which is capable of liberating free formaldehyde so that the resin is advanced to the insoluble, infusible stage upon the application of a suitable degree of heat. The preferred hardening agent is hexamethylenetetramine, known in the art as "hexa," in amounts typically ranging from 5 to 12% by weight based on the phenol-formaldehyde resin. Another hardening agent which gives excellent results is paraformaldehyde. The hardening agent should be capable of liberating formaldehyde under the conditions of curing.

Any potentially reactive cashew nut shell oil-modified phenolic resin can be employed in the practice of our invention. Such resins are extremely well-known, being available commercially. An example of such a resin is the cashew nut shell oil-modified phenol-formaldehyde resin known in the trade as Durez No. 12686. Another example is Durez No. 12687 which is a mixture of approximately 92 parts of the resin sold as Durez No. 12686 and 8 parts of hexamethylenetetramine. Still other examples of such resins containing hexamethylenetetramine as the hardening agent are the resins known in the trade as Varcum 9820 and Varcum 9831. Such resins may be made in a manner well-known to those skilled in the art.

As is well-known, cashew nut shell oil, which is obtained from the outer shell of the cashew nut, is composed largely of anacardic acid which upon heating is decomposed and converted to a long-chain unsaturated phenol, known as cardanol, which has a 7-tetradecenyl side-chain, —(CH$_2$)$_6$—CH=CH(CH$_2$)$_5$—CH$_3$, in the position meta to the hydroxyl group on the benzene ring. While cashew nut shell oil itself may be used as obtained from the shell, we prefer to use the oil which has been heated to convert it to cardanol by decarboxylation in the well-known manner.

A lower molecular weight phenol is used in conjunction with the cashew nut shell oil in making the resin; such a lower phenol can be either a monohydric or a polyhydric, preferably the former, monocyclic phenol which contains no substituents on the benzene ring other than hydrogen, hydroxyl groups and lower alkyl sidechains. Examples of such lower molecular weight phenols are phenol itself, and its homologues, such as ordinary cresylic acid which is a mixture of the three isomeric cresols, the xylenols, etc. Instead of a monohydric phenol, a polyhydric phenol, such as resorcinol, may be used.

While the proportion of cashew nut shell oil or cardanol used in making the phenolic resin may vary widely, we prefer to use it in an amount ranging from 3 to 12 mole per cent based on the sum of the moles of the cashew nut shell oil and the lower molecular weight phenol. If less than 3 mole per cent of cashew nut shell oil is used, the phenolic resin may be unduly brittle and consequently may impart objectionable brittleness to the resulting article. If more than 12 mole per cent of cashew nut shell oil is used, the products obtained may be too flexible and too soft. Within the broad purview of our invention the molar proportion of cashew nut shell oil used in making the resin may be outside the range given; thus it may range from 2 mole per cent up to 50 mole per cent based on the sum of the moles of the cashew nut shell oil and the lower phenol.

Ordinary phenol is the preferred lower phenol for making the resin. As ordinary phenol is replaced by cresol, there is a tendency for the phenolic resin obtained to become softer with a consequent lowering of the hardness of the product.

The phenolic resin is typically made by heating a mixture of the lower molecular weight phenol, the cashew nut shell oil (either as such or as cardanol) and a carefully limited proportion of a lower aliphatic aldehyde free from unsaturation, typically formaldehyde, in the presence of a suitable resin-forming catalyst, usually an acid, such as an inorganic acid, e. g., sulfuric or hydrochloric acid or an acid-reacting material as zinc chloride, to an oil-soluble stage. During the final stage of the reaction, the resin is advanced to the desired state at which it is still soluble and fusible but potentially reactive with a formaldehyde-liberating hardening agent to the insoluble, infusible form, and volatile materials are removed therefrom, both of these objects (i. e., advancement and removal of volatiles) preferably being accomplished simultaneously by passing superheated steam through the charge until the residual mixture has reached the desired temperature. The residual mixture is then dumped from the kettle and allowed to cool whereupon it is ready for blending with the vinyl resin and the plasticizer and other ingredients of the composition.

The vinyl resin, plasticizer and the phenol-aldehyde resin are first blended to an intimate, homogeneous mixture at a temperature so low that the phenol-aldehyde resin is not advanced toward the insoluble, infusible stage prior to attainment of a uniform mixture. Other ingredients, which may not be compatible, in the strict sense of the word, with these components, such as fillers, pigments, flame-resistance enhancing ingredients, stabilizers for the vinyl resin, anti-oxidants and stabilizers for the rubbery butadiene-acrylonitrile copolymer where it is used, can be and generally are included in the mixture at this point, these also being incorporated uniformly while keeping the phenolic resin in the soluble, fusible stage. If the phenolic resin does not already contain its own hardening agent, a suitable proportion of such hardening agent is incorporated at this point in the process.

The mixing is carried out at a temperature which is elevated sufficiently to promote rapid intermixture but which is so low that no substantial reaction of the phenolic resin with the hardening agent takes place so that no substantial advancement of the phenolic resin toward the insoluble, infusible stage occurs during this portion of the process. In this way an intimate homogeneous mixture is obtained before any appreciable advancement of the phenolic resin takes place. If such advancement took place prior to the attainment of an intimate mixture of the phenolic resin with the vinyl resin and the plasticizer or plasticizers, the advanced phenolic resin could not thereafter be intimately mixed with the vinyl resin and plasticizer. Hence it is of the essence of our invention to bring about intimate homogeneous intermixture prior to any such advancement. The mixing temperature will depend somewhat upon the type and amount of the phenolic resin used.

The temperature at which all of the ingredients are intimately mixed preliminarily should be sufficiently high to facilitate as rapid and as intimate a degree of intermixture as is possible but should be below the activation temperature of the hardening agent for the phenolic resin. Typically a temperature of 200 to 230° F. is employed in this part of the process, it having been found from experience that this temperature effects rapid intimate intermixture without any substantial activation of the hardener. Where the plasticizer embodies both a liquid plasticizer and a Buna N rubber, somewhat lower temperatures ranging down to say 180° F. can be used.

*Typical processing technique when plasticizer comprises Buna N rubber*

In this embodiment, a typical procedure is as follows: The rubber or a mixture of the rubber and a part or all of the vinyl resin is first banded on a cold rubber mill in the rolls of which cold water is circulated. The remaining ingredients, viz., the phenolic resin, any remaining portion of the vinyl resin, fillers or pigments, stabilizers, anti-oxidants, and liquid plasticizer if used are separately mixed at room temperature and the mixture is added slowly to the banded mass and intimately incorporated therewith. The stock temperature is kept at between 180° F. and 220° F. Mixing at this temperature is continued, typically for 10 minutes, until a smooth homogenous mixture is obtained. Steam is then introduced to the mill rolls to bring the stock temperature to from 310° F. to 320° F. The mixture is actively milled at this temperature; by "actively" it is meant that the entire portion of the stock is kept moving, no portion being allowed to stand still for any substantial time since otherwise localized setting of any isolated portions of high phenolic resin concentration might take place before intimate incorporation of such portions with the other ingredients, particularly vinyl resin and plasticizer, has taken place. It is of the essence of our invention that the phenolic resin be prevented from setting prior to such intimate incorporation since it is impossible to effect dispersion or intimate incorporation of the phenolic resin, or any portion thereof, after it has set. Milling is continued in this way until a completely uniform mass is obtained in which all of the phenolic resin is completely advanced. Typically this takes 40 minutes. The resulting mixture is then shaped while at least 300° F. into its final form, and allowed to cool to a temperature at which it is not deformed by physical forces.

*Typical processing technique when 100% liquid plasticizer is used*

All of the components except the phenolic resin are pre-mixed in the cold. The pre-mix is then banded on an open rubber mill at a temperature of 310–320° F. for 10 minutes. The resulting intimate homogeneous mixture is taken off the mill and cooled. The mill is then cooled to 200–220° F. and the cooled mixture is again banded on the mill while the phenolic resin is slowly added in small increments, care being taken to intimately incorporate each increment before the next is added. Care is also taken to keep the entire batch moving on the mill throughout this step of the process and the batch temperature is kept from exceeding 230° F. After the last increment of phenolic resin has been added mixing is continued for 10 minutes more to insure thorough mixing. The batch now is of quite uniform reddish-tan color occasionally with a few darker specks of unfused phenolic resin appearing here and there. The incidence of these dark specks should be small since they indicate incomplete mixing and if they are present in substantial amounts they may not be completely fused with the other ingredients in the next step. The resulting mixture is then heated on the mill to a temperature of 310–320° F. for 40 minutes, care being taken to keep the entire batch actively moving on the mill to prevent any possibility of setting of any portions of unfused resin that still remain, before such portions are fused with the rest of the batch. The resulting mixture is then given its final shape as before.

In general, a temperature of from 180° F. to 230° F. is suitable for the preliminary mixing of all of the components of the mixture prior to the relatively high temperature mixing for advancement of the phenolic resin, and a temperature ranging from 300° F. up to a temperature just below the point of thermal decomposition of the mixture is used in the mixing step wherein the phenolic resin is advanced.

Fusion of the phenolic resin may occur in the preliminary relatively low temperature mixing step. Such fusion tends to expedite attainment of a homogeneous mixture in this step. As previously indicated, the critical temperature is the temperature of activation of the hardening agent for the phenolic resin, and is not the softening point of the resin.

It will be seen that both of the specific mixing procedures described in detail above effect complete attainment of a homogeneously fused single phase mixture before the phenolic resin is substantially advanced. Even in the case where scattered unfused spots of phenolic resin appear in the mix resulting from the relatively low temperature mixing, the final mixing step is so conducted that these spots are fused with the other components before they are substantially advanced. Those skilled in the art can readily attain these results by following the teachings of this specification.

After the necessary uniform mixture of the several ingredients has been attained, the phenolic resin is "set," i. e., advanced to the insoluble, infusible stage. Our invention is based on our discovery that this can be done by mechanically working the mixture at a higher temperature than that used in the preliminary mixing. A temperature of at least 300° F. but below the thermal decomposition point of the mixture should be used in this step. By mechanically working or masticating the mixture at these temperatures, the phenolic resin is advanced to the thermoset state, and yet surprisingly the mixture remains workable and shapable even though the phenolic resin has been carried to the infusible stage. Apparently the vinyl resin and the plasticizer therefor plasticize the phenolic resin in some manner as a result of the complete penetration of the plasticized vinyl resin through the phenolic resin prior to conversion to the thermoset condition. We are unable, at the present time, to satisfactorily and completely explain with certainty the nature of the phenomena underlying the success of our invention. We are not limited by any theoretical considerations.

In the next step of our invention, the hot, plastic mixture resulting from the step of setting the phenolic resin in the manner just described is shaped to final form. The temperature used in the shaping step should be sufficiently elevated to keep the mixture plastic, i. e., at least 300° F. ranging upwardly to just below the point of thermal decomposition. Almost invariably the mixture is given its final shape immediately following the step of advancing the phenolic resin to thermoset condition. As previously indicated, if the composition is allowed to cool after the final or high temperature mixing step, it will solidify and must be reheated and mechanically worked at temperatures in the range just indicated to bring it back to plastic shapable condition.

Our process is much more economical and more satisfactory than would be a process in which the phenolic resin was converted to infusible condition after the mixture has been given its final shape. Our process is much simpler than any such process because we can carry out both the preliminary mixing step and the subsequent step of "setting" the phenolic resin in the same piece of equipment, such as an open two-roll rubber mill, a Banbury mixer, or other intensive masticator, simply by keeping the temperature down during mixing and subsequently raising it to effect the setting. The resulting mixture can be fed directly into the shaping equipment. In the case of shaping equipment which effects the necessary mechanical working of the mixture at the necessary elevated temperature, the set mixture can be allowed to cool down before being fed to such shaping equipment.

Our invention is particularly advantageous in that the final shaping of our mixture can be done without resort to the batchwise high pressure molding equipment commonly used with phenolic resin compositions. Our invention opens up an entirely new field of application for phenolic resins in that it enables the production of a mixture containing such phenolic resins in final cured condition, which mixture can be applied in ways never before deemed feasible for compositions containing cured phenolic resins. So far as we are aware, prior art workers have always considered it to be essential that compositions containing phenolic resins be given their final shape as by molding, calendering or extrusion while such phenolic resins are in the uncured state, the shaped mixtures being subsequently treated to advance the phenolic resin to the final stage.

The proportions of the several ingredients used in the composition of our invention can vary quite widely, depending upon the flexibility and the properties desired in the final product. For applications where reasonable flexibility is desired, the content of phenolic resin should not exceed 20% based on the sum of the vinyl resin, the plasticizer and the phenolic resin. Larger amounts, ranging from 20% to 50% can be used and produce greater resistance to heat deformation, but are considerably more difficult to shape by operations typified by extrusion and calendering and give a product having much lower flexibility. Amounts lower than 5% do not produce the desired resistance to heat and to abrasion and do not give the other advantages of our invention to the desired extent. A preferred range is from 10 to 15% of the phenolic resin.

The ranges of proportions of the ingredients of our composition typically are as follows:

| | Per cent by weight |
|---|---|
| Vinyl resin | 30 to 70 |
| Plasticizer | 20 to 45 |
| Phenolic resin | 5 to 50 |

More commonly the ranges of proportions are as follows:

| | Per cent by weight |
|---|---|
| Vinyl resin | 40 to 70 |
| Plasticizer | 20 to 45 |
| Phenolic resin | 5 to 20 |

The foregoing percentages are based on the sum of the vinyl resin, plasticizer therefor including Buna N rubber where used and phenolic resin and total 100%.

EXAMPLE 1

The following formulation was used:

| | Parts by weight |
|---|---|
| Polyvinyl chloride (gamma form) | 42.1 |
| Buna N rubber | 23.6 |
| Dioctyl phthalate | 5.6 |
| Cashew nut shell oil-modified phenol-formaldehyde resin known as Durez 12687 (contains about 8% "hexa" as hardening agent) | 10.5 |
| Antimony trioxide (flame-resisting ingredient) | 4.2 |
| Clay | 5.3 |
| Dibasic lead stearate | 0.5 |
| Dibasic lead phosphite | 4.7 |
| Normal lead salicylate | 1.6 |
| Anti-oxidant for Buna N such as a mixture of mono- and di-heptylated diphenylamines | 2.6 |

The clay is a filler and pigment. The lead compounds stabilize the polyvinyl chloride. Instead of the anti-oxidant listed, any other suitable anti-oxidant or stabilizer for the Buna N can be used, such as 2,5-ditertiary butyl p-cresol.

The foregoing ingredients are processed as described above for the embodiment in which the plasticizer comprises Buna N rubber. The resulting hot plastic mixture was extruded as a jacket 0.117 inch in overall diameter around a stranded size 16 aircraft wire (copper) which itself had an overall diameter of 0.057 inch and had been coated with an extruded jacket of polyethylene having an outside diameter of 0.077 inch.

After application of the foregoing mixture, there was then extruded around the jacketed wire a coating of nylon. The final overall diameter of the insulated conductor was 0.127 inch.

EXAMPLE 2

The following formulation was used:

| | Parts by weight |
|---|---|
| Polyvinyl chloride (gamma form) | 50.5 |
| Durez 12687 | 10.1 |
| Dioctyl phthalate | 25.2 |
| Antimony trioxide | 4.0 |
| Basic silicate of white lead | 4.5 |
| Lead stearate | 0.5 |
| Clay | 5.0 |

These ingredients were processed as described above for a 100% liquid plasticizer mix. The composition obtained was extruded around wire in the same way as in Example 1, followed by application of a nylon jacket as in Example 1.

Wire insulated with only the formulations of Examples 1 and 2 (i. e., without the polyethylene or nylon jackets) was tested for resistance to high temperatures, in comparison with a similar wire in which the insulating layer of the present invention was replaced by a comparative layer of plasticizer polyvinyl chloride containing no phenolic resin, with the following results:

| Deformation (Percent decrease in diameter when heated under load) at Temperature of— | Wire Insulated with Formulation of Example 1 | Wire Insulated with Formulation of Example 2 | Comparable Wire Insulated with Plasticized Polyvinyl Chloride (No Phenolic Resin) |
|---|---|---|---|
| 121° C | 20 | 9 | 30 |
| 140° C | 28 | 19 | 54 |

By still further increasing the proportion of the phenolic resin in the composition of Examples 1 and 2, even greater resistance to heat can be obtained at the expense, however, of flexibility.

EXAMPLES 3 TO 9

In these examples, the ingredients shown in the following tables were processed as described above for mixtures wherein the plasticizer includes Buna N rubber, the resulting composition being extruded upon a copper wire. Samples of the resulting composition were molded into slab or sheet form and physical properties of the resulting molded specimens were determined as shown in the tables.

| Example No | 3 | 4 | 5 | 6 |
|---|---|---|---|---|
| Polyvinyl Chloride (Gamma) | 55 | 75 | 55 | 75 |
| Buna N | 45 | 25 | 45 | 25 |
| Durez 12687 | 20 | 20 | 15 | 15 |
| Antimony Trioxide | 6 | 6 | 6 | 6 |
| Clay | 10 | 10 | 10 | 10 |
| Basic Silicate of White Lead | 10 | 10 | 10 | 10 |
| Fused Lead Stearate | 1 | 1 | 1 | 1 |
| Anti-oxidant for Buna N (as in Example 1) | 2 | 2 | 2 | 2 |
| Physical Properties: | | | | |
| Original Tensile, p. s. i | 2,380 | 3,570 | 2,310 | 3,670 |
| Original Elongation, percent | 220 | 45 | 265 | 105 |
| Deformation, percent Decrease in dimension when heated under load at 140° C. in molded Sheets | 33 | 20 | 37 | 25 |

| Example No | 7 | 8 | 9 |
|---|---|---|---|
| Polyvinyl Chloride (Gamma) | 80 | 80 | 55 |
| Buna N | 45 | 45 | 45 |
| Durez 12687 | 25 | 20 | 20 |
| Dioctyl Pthalate | 10 | 10 | 10 |
| Antimony Trioxide | 8 | 8 | 8 |
| Clay | 10 | 10 | 10 |
| Basic Silicate of White Lead | 9 | 9 | 9 |
| Fused Lead Stearate | 1 | 1 | 1 |
| Anti-oxidant for Buna N (as in Example 1) | 2 | 2 | 2 |
| Physical Properties: | | | |
| Original Tensile, p. s. i | 1,960 | 2,500 | 2,190 |
| Original Elongation, percent | 125 | 210 | 225 |
| Deformation, percent Decrease in dimension at 140° C. in Molded Sheets | 29 | 22 | 28 |
| D. C. Volume Resistance, Ohms/in.³ ×10⁶ | 5.9 | 13.4 | 5.0 |

From the foregoing it will be seen that the present invention provides an unusually advantageous composition of matter and a simple and economical method of making the same. Our composition and method of processing are such that a heat-resistant final product is obtained merely by shaping the hot mixture, no heat treatment subsequent to shaping being required to set the phenolic resin constituent. Mere cooling of the hot shaped mixture of our invention gives a product having remarkable resistance to heat. Numerous other advantages will be obvious to those skilled in the art.

Having thus described our invention, what we claim and desire to protect by Letters Patent is:

1. The process which comprises intimately mixing a thermosetting phenol-aldehyde resin of the novolac type, a hardening agent therefor, a vinyl resin selected from the group consisting of polyvinyl chloride and copolymers of a major proportion of vinyl chloride and a minor proportion of a copolymerizable monomer, said vinyl resin being compatible with said phenol-aldehyde resin, and a plasticizer for said vinyl resin, said plasticizer being compatible with said phenol-aldehyde resin, the relative proportions of said ingredients being as follows:

| | Per cent by weight |
|---|---|
| Vinyl resin | 30 to 70 |
| Plasticizer | 20 to 45 |
| Phenol-aldehyde resin | 5 to 50 | said percentages being based on the sum of said three ingredients and totalling 100%, at a temperature sufficiently low that said phenol-aldehyde resin is not advanced to the insoluble, infusible stage, until a homogeneous mixture is obtained, subsequently masticating said mixture at a temperature of at least 300° F. until said phenol-aldehyde resin is advanced to the insoluble, infusible stage, whereby there is obtained a plastic shapable mixture which upon cooling is extremely resistant to deformation when subjected to heat alone.

2. The process which comprises intimately mixing a thermosetting phenol-aldehyde resin of the novolac type, a hardening agent therefor, a vinyl resin selected from the group consisting of polyvinyl chloride and copolymers of a major proportion of vinyl chloride and a minor proportion of a copolymerizable monomer, said vinyl resin being compatible with said phenol-aldehyde resin, and a plasticizer for said vinyl resin, said plasticizer being compatible with said phenol-aldehyde resin, the relative proportions of said ingredients being as follows:

| | Per cent by weight |
|---|---|
| Vinyl resin | 30 to 70 |
| Plasticizer | 20 to 45 |
| Phenol-aldehyde resin | 5 to 50 | said percentages being based on the sum of said three ingredients and totalling 100%, at a temperature sufficiently low that said phenol-aldehyde resin is not advanced to the insoluble, infusible stage, until a homogeneous mixture is obtained, subsequently masticating said mixture at a temperature of at least 300° F. until said phenol-aldehyde resin is advanced to the insoluble, infusible stage, whereby there is obtained a plastic shapable mixture which upon cooling is extremely resistant to deformation when subjected to heat alone, shaping the hot mixture resulting from said masticating step, and allowing the shaped mixture to cool to a temperature at which it will retain its shape.

3. The process which comprises intimately mixing a thermosetting cashew nut shell oil-modified phenol-aldehyde resin of the novolac type, a hardening agent therefor, a vinyl resin selected from the group consisting of polyvinyl chloride and copolymers of a major proportion of vinyl chloride and a minor proportion of a copolymerizable monomer, said vinyl resin being compatible with said phenol-aldehyde resin, and a plasticizer for said vinyl resin, said plasticizer being compatible with said phenol-aldehyde resin, the relative proportions of said ingredients being as follows:

| | Per cent by weight |
|---|---|
| Vinyl resin | 30 to 70 |
| Plasticizer | 20 to 45 |
| Phenol-aldehyde resin | 5 to 50 | said percentages being based on the sum of said three ingredients and totalling 100%, at a temperature ranging from 180° F. to 230° F., until an intimate homogoneous mixture is obtained, subsequently masticating said mixture at a temperature ranging from 300° F. to a point just below the point of thermal decomposition of said mixture, and thereby obtaining a mixture which is plastic and shapable and which upon cooling is extremely resistant to deformation when subjected to heat alone, shaping the hot mixture resulting from said masticating step, and allowing the hot shaped article to cool to a temperature at which it will retain its shape.

4. The process which comprises intimately admixing a thermosetting phenol-aldehyde resin of the novolac type, a hardening agent therefor, a vinyl resin selected from the group consisting of polyvinyl chloride and copolymers of a major proportion of vinyl chloride and a minor proportion of a copolymerizable monomer, said vinyl resin being compatible with said phenol-aldehyde resin, and a plasticizer for said vinyl resin, said plasticizer being compatible with said phenol-aldehyde resin, the proportions of said ingredients being as follows:

| | Per cent by weight |
|---|---|
| Vinyl resin | 40 to 70 |
| Plasticizer | 20 to 45 |
| Phenol-aldehyde resin | 5 to 20 | said percentages being based on the sum of said three ingredients and totalling 100%, at a temperature ranging from 180° F. to 230° F., until an intimate homogeneous mixture is obtained, subsequently masticating said mixture at a temperature ranging from 300° F. to a point just below the point of thermal decomposition of said mixture, and thereby obtaining a mixture which is plastic and shapable and which upon cooling is extremely resistant to deformation when subjected to heat alone, shaping the hot mixture resulting from said masticating step, and allowing the hot shaped mixture to cool to a temperature at which it will retain its shape.

5. A process as set forth in claim 1 wherein said plasticizer comprises a butadiene-acrylonitrile rubbery copolymer.

6. A process as set forth in claim 2 wherein said plasticizer comprises a butadiene-acrylonitrile rubbery copolymer.

7. A process as set forth in claim 3 wherein said plasticizer comprises a butadiene-acrylonitrile rubbery copolymer.

8. As a new composition of matter, a uniform homogeneous mixture of a vinyl resin selected from the group consisting of polyvinyl chloride and copolymers of a major proportion of vinyl chloride and a minor proportion of a coplymerizable monomer, a plasticizer for said vinyl resin, said plasticizer comprising a butadiene-acrylonitrile rubbery copolymer, and a thermoset phenol-aldehyde resin of the novolac type which has been advanced to the insoluble, infusible stage while in intimate and homogeneous admixture with said vinyl resin and said plasticizer, the relative proportions of said ingredients being as follows:

| | Per cent by weight |
|---|---|
| Vinyl resin | 30 to 70 |
| Plasticizer | 20 to 45 |
| Phenol-aldehyde resin | 5 to 50 | said percentages being based on the sum of said three ingredients and totalling 100%, said phenol-aldehyde resin having been advanced to said stage by heating a mixture of said three ingredients with a hardening agent for said phenol-aldehyde resin to a temperature of at least 300° F. and simultaneously mechanically working the mixture.

9. A composition of matter as set forth in claim 8 wherein said phenol-aldehyde resin is cashew nut shell oil-modified.

10. An insulated electrical conductor characterized by good flexibility at low as well as high temperatures and excellent resistance to flame, to abrasion, and to deformation at high temperatures, comprising a metallic conductor, and a continuous annular insulating jacket surrounding said conductor, said jacket comprising a uniform homogeneous mixture of a vinyl resin selected from the group consisting of polyvinyl chloride and copolymers of a major proportion of vinyl chloride and a minor proportion of a copolymerizable monomer, a plasticizer for said vinyl resin, said plasticizer comprising a butadiene-acrylonitrile rubbery copolymer, and a thermoset phenol-aldehyde resin of the novolac type which has been advanced to the insoluble, infusible stage while in intimate admixture with said vinyl resin, said plasticizer, and a hardening agent for said phenol-aldehyde resin, by heating the mixture to a temperature of at least 300° F. and simultaneously mechanically working the mixture, the relative proportions of said ingredients being as follows:

| | Per cent by weight |
|---|---|
| Vinyl resin | 40 to 70 |
| Plasticizer | 20 to 45 |
| Phenol-aldehyde resin | 5 to 20 | the said percentages being based on the sum of the vinyl resin, plasticizer and phenol-aldehyde resin and totalling 100%.

11. An insulated electrical conductor as set forth in claim 10 wherein said phenol-aldehyde resin is a cashew nut shell oil-modified resin.

12. An insulated electrical conductor as set forth in claim 10 wherein said plasticizer is composed of a butadiene-acrylonitrile rubbery copolymer and dioctyl phthalate, and wherein said phenol-aldehyde resin is a cashew nut shell oil-modified resin.

SIDNEY E. BERGER.
KERMIT M. WEBB.

References Cited in the file of this patent

UNITED STATES PATENTS

| Number | Name | Date |
|---|---|---|
| 2,293,164 | Myers | Aug. 18, 1942 |
| 2,454,209 | Rogers et al. | Nov. 16, 1948 |
| 2,459,739 | Groten et al. | Jan. 18, 1949 |

OTHER REFERENCES

Young et al., Ind. & Eng. Chem., vol 39, No. 11, November 1947, pp. 1446–1452.